(12) United States Patent
Zhang et al.

(10) Patent No.: US 8,146,564 B2
(45) Date of Patent: Apr. 3, 2012

(54) ENGINE INTAKE AIR FLOW CONTROL ASSEMBLY

(75) Inventors: Jian Jun Zhang, Rochester, MI (US); Mark A. Mitchell, Dryden, MI (US); Ko-Jen Wu, Troy, MI (US)

(73) Assignee: GM Global Technology Operations LLC

( * ) Notice: Subject to any disclaimer, the term of this patent is extended or adjusted under 35 U.S.C. 154(b) by 210 days.

(21) Appl. No.: 12/651,674

(22) Filed: Jan. 4, 2010

(65) Prior Publication Data
US 2011/0162611 A1 Jul. 7, 2011

(51) Int. Cl.
*F02B 31/08* (2006.01)
(52) U.S. Cl. ............ 123/308; 123/188.14; 123/336; 123/337; 123/432
(58) Field of Classification Search ............ 123/188.14, 123/306, 308, 336, 337, 432
See application file for complete search history.

(56) References Cited

U.S. PATENT DOCUMENTS

| | | | |
|---|---|---|---|
| 4,240,387 A * | 12/1980 | Motosugi et al. | 123/184.45 |
| 4,300,500 A * | 11/1981 | Motosugi et al. | 123/308 |
| 4,344,394 A * | 8/1982 | Showalter | 123/306 |
| 5,311,848 A * | 5/1994 | Isaka et al. | 123/188.14 |
| 5,359,972 A | 11/1994 | Isaka | |
| 5,592,916 A | 1/1997 | Stockhausen et al. | |
| 5,979,401 A | 11/1999 | Hickey | |
| 6,155,229 A | 12/2000 | Cantrell, Jr. et al. | |
| 6,394,066 B1 | 5/2002 | Chou et al. | |
| 6,575,133 B2 * | 6/2003 | Ries-Mueller et al. | 123/306 |
| 6,705,280 B1 * | 3/2004 | Lippert | 123/306 |
| 6,782,872 B2 * | 8/2004 | Moschini et al. | 123/470 |
| 6,827,060 B2 * | 12/2004 | Huh | 123/336 |
| 7,128,050 B1 * | 10/2006 | Abe | 123/306 |
| 7,188,604 B2 * | 3/2007 | Isaji et al. | 123/337 |
| 7,293,546 B1 | 11/2007 | Confer et al. | |
| 7,568,464 B2 | 8/2009 | Spegar | |
| 7,806,103 B2 * | 10/2010 | Torii | 123/336 |
| 7,980,219 B2 * | 7/2011 | Sano et al. | 123/336 |
| 2004/0159308 A1 * | 8/2004 | Lee | 123/336 |
| 2007/0144483 A1 * | 6/2007 | Torii et al. | 123/337 |
| 2007/0181097 A1 * | 8/2007 | Torii et al. | 123/306 |
| 2007/0227495 A1 * | 10/2007 | Isaji et al. | 123/306 |
| 2008/0035094 A1 * | 2/2008 | Torii et al. | 123/188.14 |
| 2008/0035107 A1 * | 2/2008 | Torii | 123/336 |

* cited by examiner

*Primary Examiner* — Erick Solis
(74) *Attorney, Agent, or Firm* — Harness, Dickey & Pierce, P.L.C.

(57) ABSTRACT

An engine assembly may include a cylinder head, an intake manifold assembly, first and second vanes, and an actuation mechanism. The first and second vanes may be rotatably coupled to the intake manifold assembly. The first vane may be located within an outlet of a first intake passage and the second vane may be located within an outlet of a second intake passage. The first and second vanes may be displaceable from an open position to a closed position. The first vane may extend along a wall defining the first intake passage when in the open position and the second vane may extend along a wall defining the second intake passage when in the open position. The actuation mechanism may be coupled to the first and second vanes to rotate the first and second vanes between the open and closed positions.

14 Claims, 6 Drawing Sheets

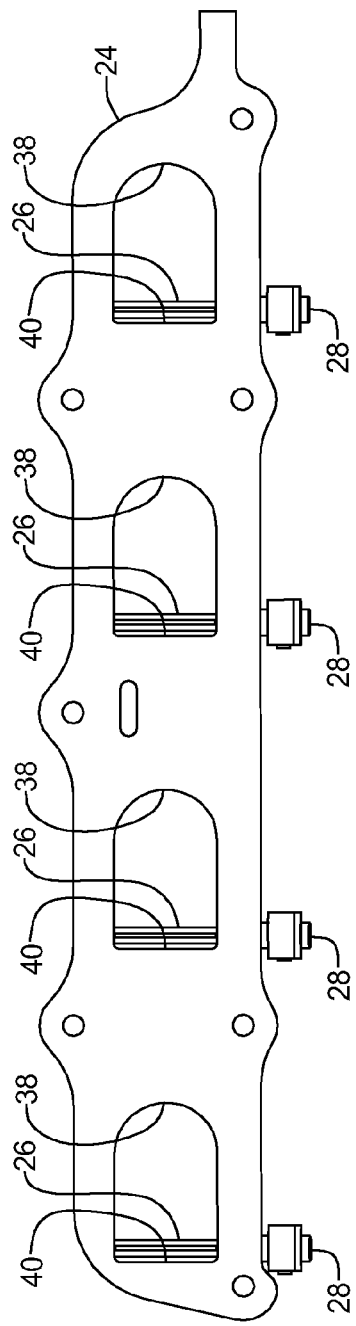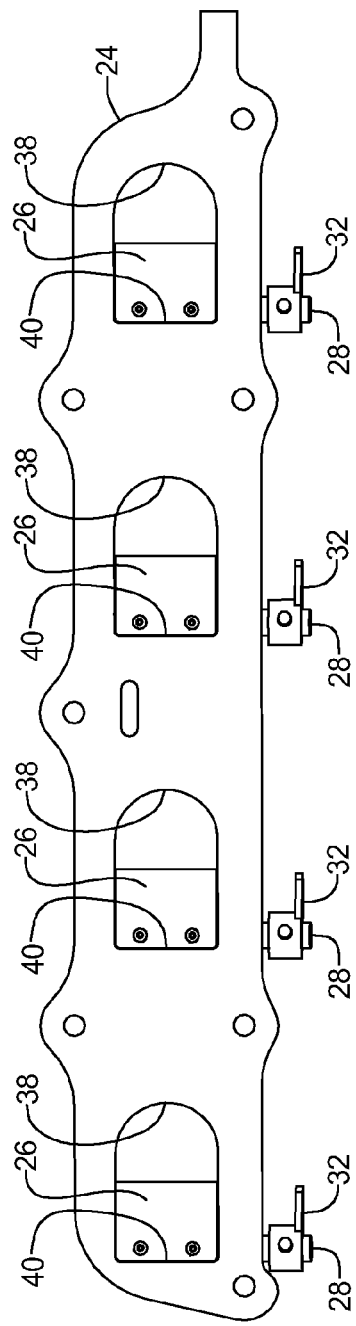

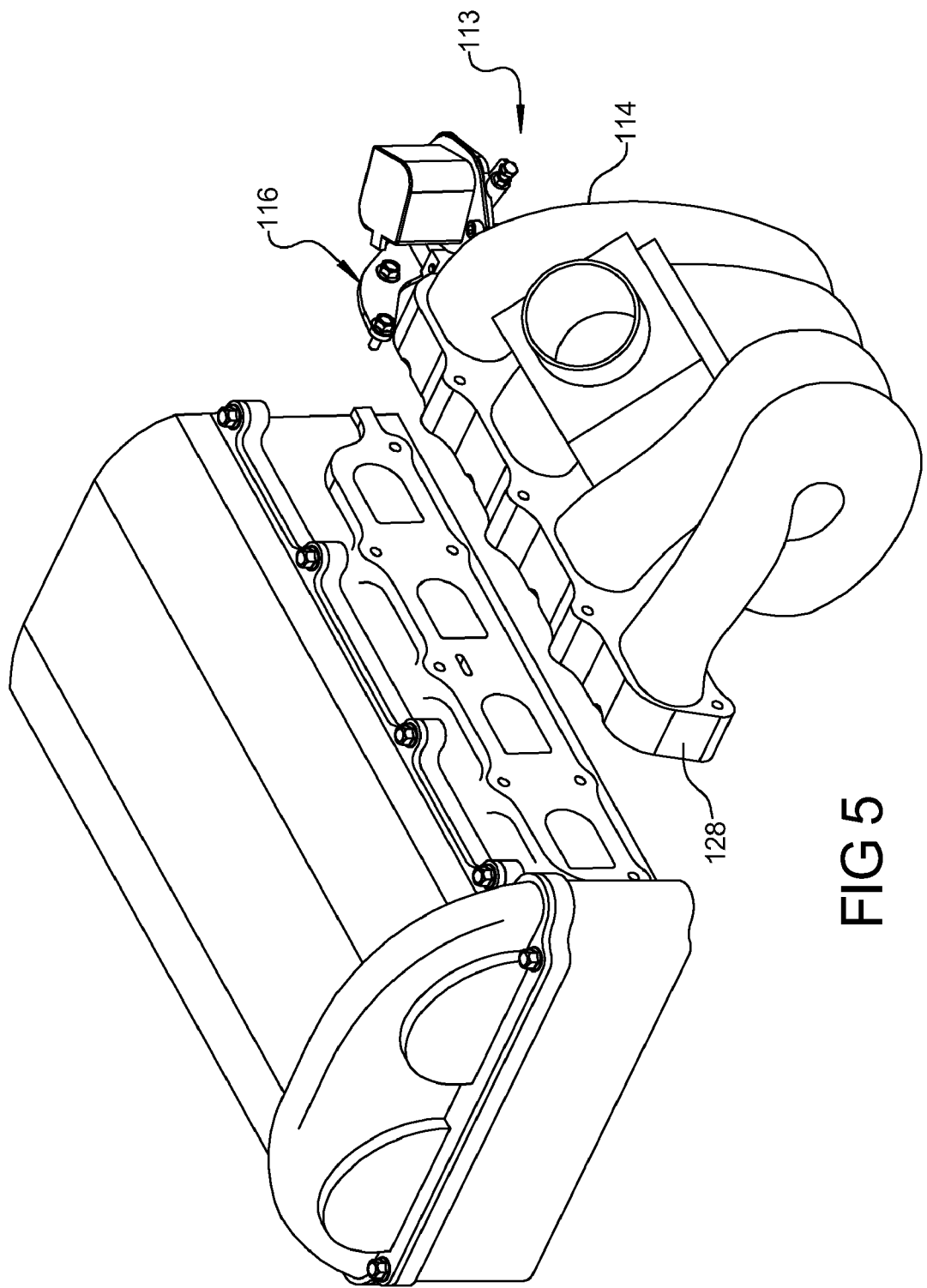

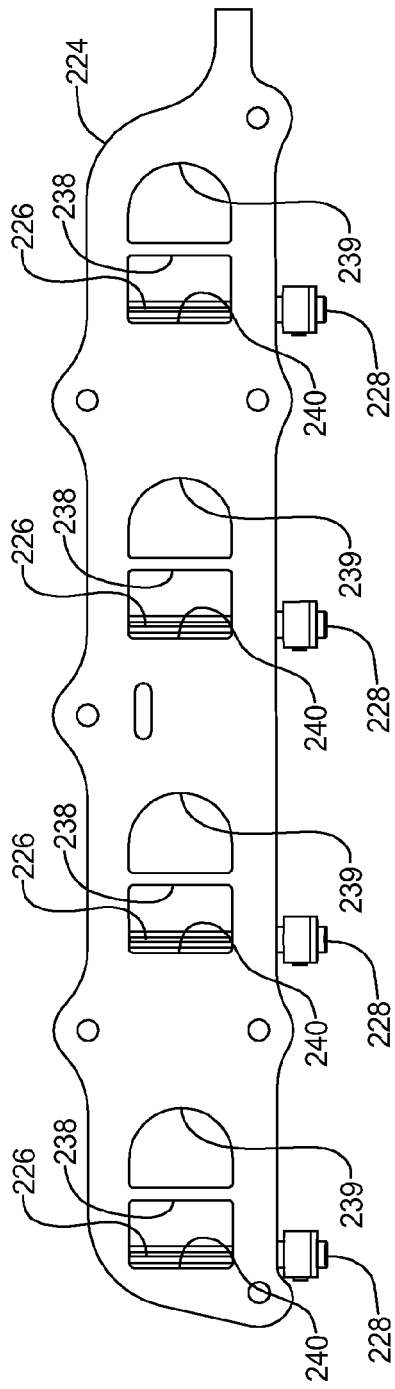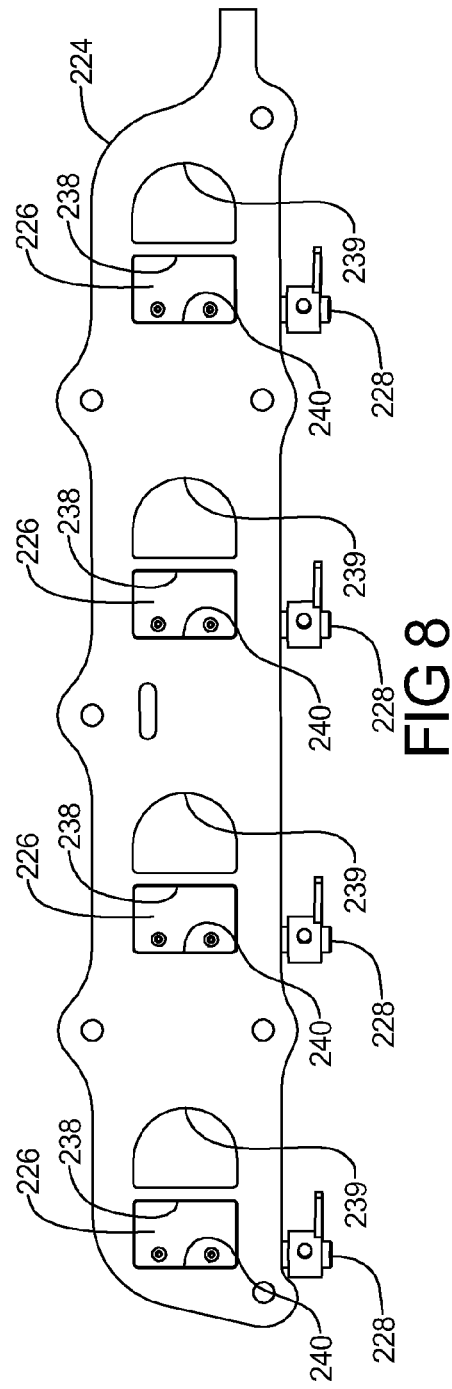

ENGINE INTAKE AIR FLOW CONTROL ASSEMBLY

FIELD

The present disclosure relates to engine assemblies, and more specifically to intake air flow control in engines.

BACKGROUND

This section provides background information related to the present disclosure which is not necessarily prior art.

Internal combustion engines may combust a mixture of air and fuel in cylinders and thereby produce drive torque. Air and fuel flow into and out of the cylinders may be controlled by a valvetrain. Controlling air flow into the cylinders to generate swirl or tumble flow may enhance combustion at some operating conditions. Swirl and/or tumble flow may be generated by providing an obstruction in the intake air flow path. However, combustion at other operating conditions may benefit from an unobstructed intake air flow path.

SUMMARY

An intake air flow control assembly may include a plate, a first vane and a second vane. The plate may be adapted to be located between an outlet of an intake manifold and a cylinder head. The plate may define first and second intake passages providing communication between the intake manifold outlet and first and second intake ports of the cylinder head. The first vane may be rotatably coupled to the plate and located within the first intake passage. The first vane may be displaceable from an open position where the first vane extends along a first wall defining the first intake passage to a closed position where the first vane extends inwardly from the first wall to obstruct an air flow to the first intake port. The second vane may be rotatably coupled to the plate and located within the second intake passage. The second vane may be displaceable from an open position where the second vane extends along a second wall defining the second intake passage to a closed position where the second vane extends inwardly from the second wall to obstruct an air flow to the second intake port.

An intake manifold assembly may include an intake manifold, a first vane and a second vane. The intake manifold may define first and second intake passages providing air flow to first and second intake ports of a cylinder head. The first vane may be rotatably coupled to the intake manifold and located within an outlet of the first intake passage. The first vane may be displaceable from an open position where the first vane extends along a first wall defining the first intake passage to a closed position where the first vane extends inwardly from the first wall to obstruct an air flow to the first intake port. The second vane may be rotatably coupled to the intake manifold and located within the second intake passage. The second vane may be displaceable from an open position where the second vane extends along a second wall defining the second intake passage to a closed position where the second vane extends inwardly from the second wall to obstruct an air flow to the second intake port.

An engine assembly may include a cylinder head, an intake manifold assembly, first and second vanes, and an actuation mechanism. The cylinder head may define first and second intake ports. The intake manifold assembly may be coupled to the cylinder head and may define a first intake passage in communication with the first intake port and a second intake passage in communication with the second intake port. The first vane may be rotatably coupled to the intake manifold assembly and located within an outlet of the first intake passage. The first vane may be displaceable from an open position where the first vane extends along a first wall defining the first intake passage to a closed position where the first vane extends inwardly from the first wall to obstruct an air flow to the first intake port. The second vane may be rotatably coupled to the intake manifold assembly and located within the second intake passage. The second vane may be displaceable from an open position where the second vane extends along a second wall defining the second intake passage to a closed position where the second vane extends inwardly from the second wall to obstruct an air flow to the second intake port. The actuation mechanism may be coupled to the first and second vanes to rotate the first and second vanes between the open and closed positions.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

FIG. 3 is a plan view of the intake air flow control assembly of FIG. 2 in a first position;

FIG. 4 is a plan view of the intake air flow control assembly of FIG. 2 in a second position;

FIG. 5 is a perspective exploded view of a portion of an alternate engine assembly according to the present disclosure;

FIG. 7 is a plan view of the intake air flow control assembly of FIG. 6 in a first position; and FIG. 8 is a plan view of the intake air flow control assembly of FIG. 6 in a second position.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Figure 1:
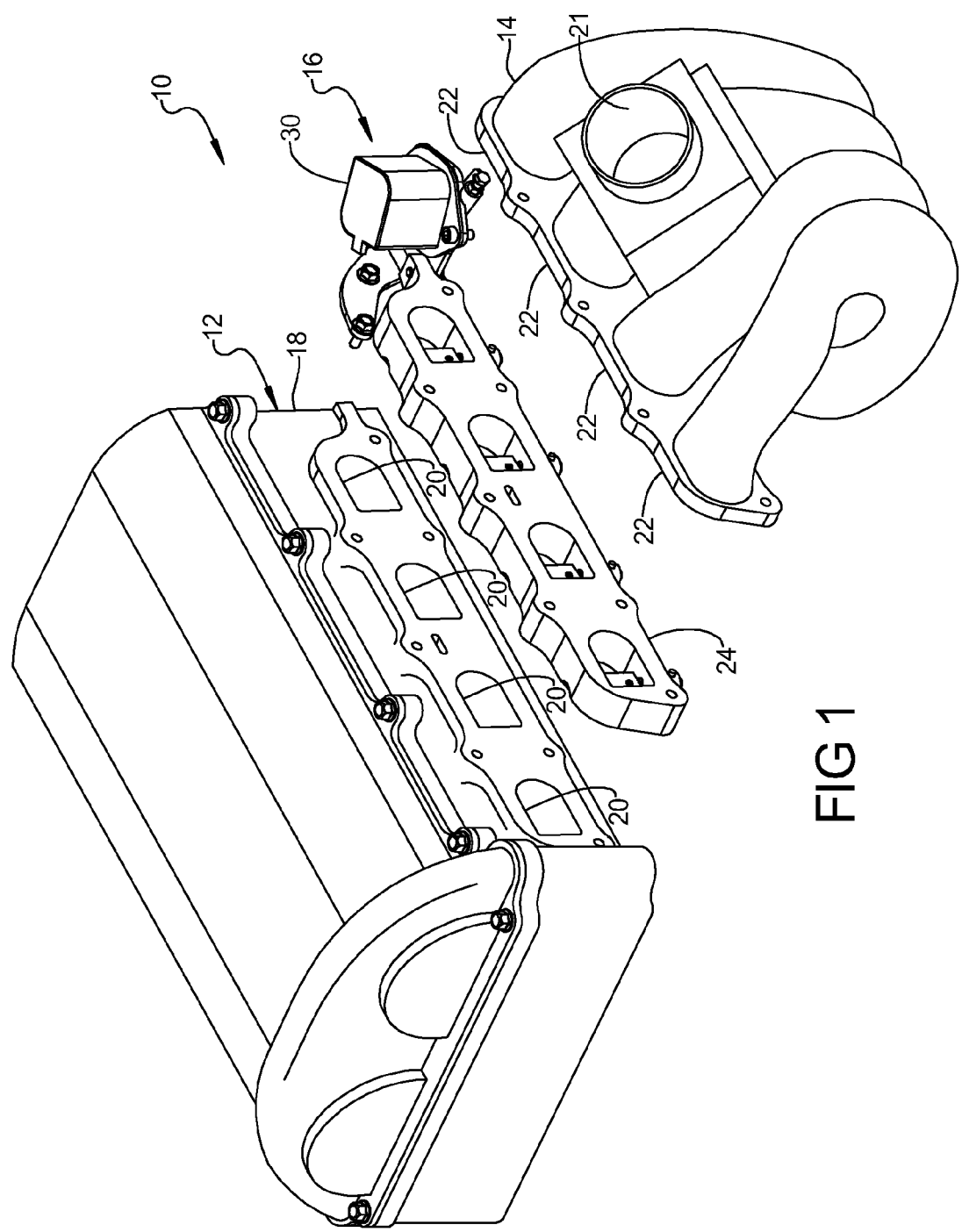
FIG. 1 is a perspective exploded view of a portion of an engine assembly according to the present disclosure.

With reference to FIG. 1, an engine assembly 10 may include an engine structure 12, an intake manifold 14 and an intake air flow control assembly 16. The engine structure 12 may include a cylinder head 18 defining intake ports 20. The intake manifold 14 may be coupled to the cylinder head 18 and may include an inlet 21 and outlets 22 to provide air flow to the intake ports 20. The intake air flow control assembly 16 may be coupled to the cylinder head 18 and located between the outlets 22 of the intake manifold 14 and the intake ports 20.

Figure 2:
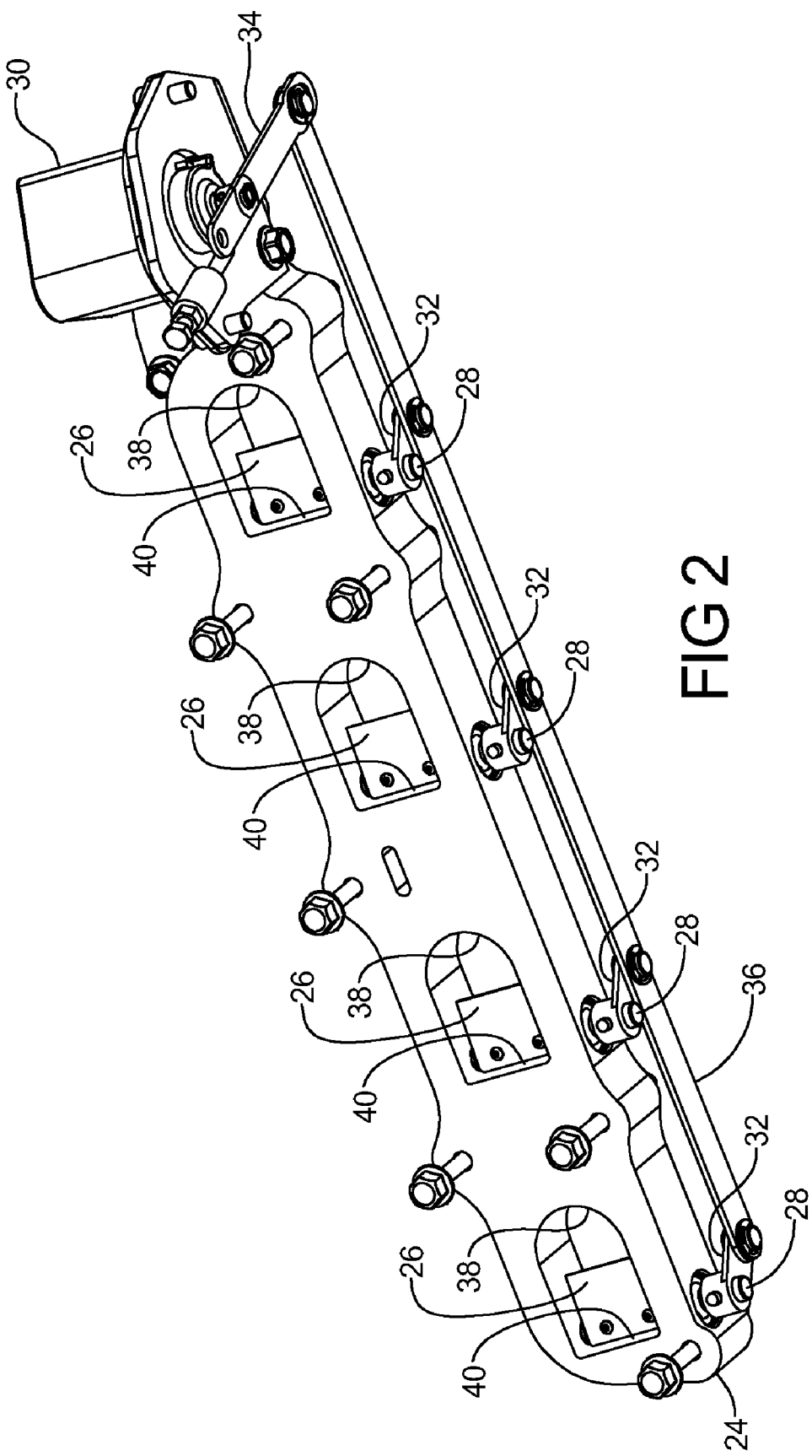
FIG. 2 is a perspective view of the intake air flow control assembly shown in FIG. 1.

With additional reference to FIGS. 2-4, the intake air flow control assembly 16 may include a plate 24, vanes 26, pivot members 28, an actuation mechanism 30, pivot arms 32, an actuation arm 34 and an intermediate arm 36. The plate 24 may define intake passages 38. The vanes 26 may be located within the intake passages 38 and rotatably coupled to the plate 24 by the pivot members 28. The pivot members 28 may be located adjacent walls 40 defining the intake passages 38.

The pivot members 28 may define rotational axes spaced apart from and parallel to one another. A pivot arm 32 may be fixed for rotation with each of the pivot members 28 at a first end of the pivot arm 32. The pivot arm 32 may extend radially from the pivot member 28 and perpendicular relative to the rotational axis of the pivot member 28. Second ends of the pivot arms 32 may be rotatably coupled to the intermediate arm 36. The actuation arm 34 may be rotationally driven by the actuation mechanism 30 and engaged with the intermediate arm 36. By way of non-limiting example, the actuation mechanism 30 may include an electric motor.

During operation, the vanes 26 may be displaced from an open position (FIG. 3) to a closed position (FIG. 4) by the actuation mechanism 30. Specifically, the actuation mechanism 30 may rotate the actuation arm 34 resulting in longitudinal displacement of the intermediate arm 36. As the intermediate arm 36 is displaced, the pivot arms 32 are rotated. Rotation of the pivot arms 32 causes the vanes 26 to rotate due to the engagement with the pivot members 28.

As seen in FIG. 3, the intake passages 38 may be generally unobstructed when the vanes 26 are in the open position. The location of the pivot members 28 may reduce a flow restriction in the intake passages 38 by locating the vanes 26 directly adjacent and parallel to the walls 40 when in the opened position. The vanes 26 may extend radially inward from the walls 40 when in the closed position seen in FIG. 4 to restrict air flow to the intake ports 20. The restriction provided when the vanes 26 are in the closed position may induce swirl or tumble flow (depending on the vane arrangement) within engine combustion chambers (not shown).

In another non-limiting example, seen in FIG. 5, the intake manifold assembly 113 may include the intake manifold 114 and the intake air flow control assembly 116. Specifically, the intake manifold 114 may include a plate region 128 integrally formed therewith as a monolithic member. The remainder of the intake air flow control assembly 116 may be generally similar to the intake air flow control assembly 16 described above and therefore will not be described in detail with the understanding that the description above applies equally.

Figure 6:
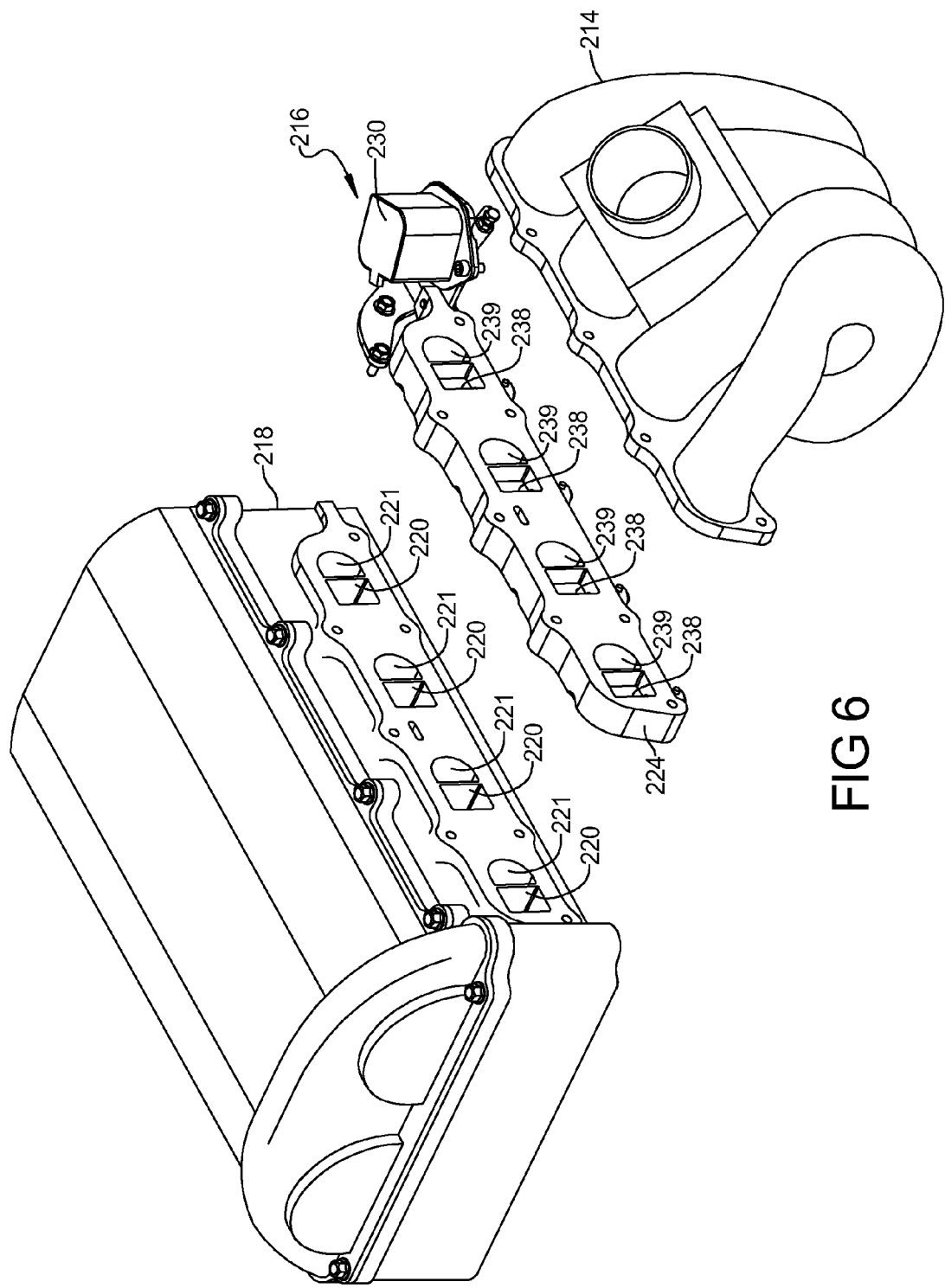
FIG. 6 is a perspective exploded view of a portion of an alternate engine assembly according to the present disclosure.

In yet another non-limiting example, seen in FIGS. 6-8, the intake air flow control assembly 216 may include first and second sets of intake passages 238, 239. The vanes 226 and pivot members 228 may be located in the first intake passages 238, leaving the second intake passages 239 unobstructed. The actuation mechanism 230 may be similar to the actuation mechanism 30 described above and therefore will not be described in detail with the understanding that the description above applies equally.

As seen in FIG. 6, the cylinder head 218 may define separate first and second intake ports 220, 221 for each combustion chamber (not shown) instead of a common inlet that branches into two intake ports for each combustion chamber as shown in FIG. 1. In the arrangement of FIGS. 6-8, the first intake ports 220 may be generally unobstructed when the vanes 226 are in the open position seen in FIG. 7. The vanes 226 may extend radially inward from the walls 240 when in the closed position seen in FIG. 8 to restrict air flow to the first intake ports 220. By way of non-limiting example, the first intake ports 220 may be completely closed by the vanes 226 when the vanes 226 are in the closed position, preventing air flow from the intake manifold 214 to the first intake ports 220.

Additionally, it is understood that the arrangement seen in FIGS. 6-8 may be incorporated in a system where the plate 224 and intake manifold 214 are formed as an integral member, such as the arrangement shown in FIG. 5.

What is claimed is:

1. An intake air flow control assembly comprising:
    a plate adapted to be located between an outlet of an intake manifold and a cylinder head, the plate defining first and second intake passages providing communication between the intake manifold outlet and first and second intake ports of the cylinder head;
    a first vane rotatably coupled to the plate and located within the first intake passage, the first vane displaceable from an open position where the first vane extends along a first wall defining the first intake passage to a closed position where the first vane extends inwardly from the first wall to obstruct an air flow to the first intake port;
    a second vane rotatably coupled to the plate and located within the second intake passage, the second vane displaceable from an open position where the second vane extends along a second wall defining the second intake passage to a closed position where the second vane extends inwardly from the second wall to obstruct an air flow to the second intake port;
    a first pivot member rotatably coupled to the plate adjacent the first wall, the first vane fixed for rotation with the first pivot member;
    a second pivot member rotatably coupled to the plate adjacent the second wall, the second vane fixed for rotation with the second pivot member;
    a first arm having a first end fixed for rotation with the first pivot member;
    a second arm having a first end fixed for rotation with the second pivot member; and
    a third arm coupled to a second end of the first arm and coupled to a second end of the second arm, the second end of the first arm and the second end of the second arm being fixed for displacement with the third arm.

2. The intake air flow control assembly of claim 1, further comprising an actuation mechanism coupled to the third arm, the third arm displaceable by the actuation mechanism to displace the first and second vanes between the opened and closed positions.

3. The intake air flow control assembly of claim 2, wherein the third arm is displaceable in a direction generally perpendicular to a rotational axis of the first pivot member.

4. The intake air flow control assembly of claim 1, wherein the first pivot member defines a first rotational axis spaced apart from and generally parallel to a rotational axis defined by the second pivot member.

5. The intake air flow control assembly of claim 1, wherein the plate defines a third intake passage providing communication between the intake manifold outlet and a third intake port of the cylinder head, the third intake passage being unobstructed when the first and second vanes are in the closed position.

6. An intake manifold assembly comprising:
    an intake manifold defining first and second intake passages providing air flow to first and second intake ports of a cylinder head;
    a first vane rotatably coupled to the intake manifold and located within an outlet of the first intake passage, the first vane displaceable from an open position where the first vane extends along a first wall defining the first intake passage to a closed position where the first vane extends inwardly from the first wall to obstruct an air flow to the first intake port;
    a second vane rotatably coupled to the intake manifold and located within the second intake passage, the second vane displaceable from an open position where the second vane extends along a second wall defining the second intake passage to a closed position where the second vane extends inwardly from the second wall to obstruct an air flow to the second intake port;
a first pivot member rotatably coupled to the intake manifold adjacent the first wall, the first vane fixed for rotation with the first pivot member;
a second pivot member rotatably coupled to the intake manifold adjacent the second wall, the second vane fixed for rotation with the second pivot member;
a first arm having a first end fixed for rotation with the first pivot member;
a second arm having a first end fixed for rotation with the second pivot member; and
a third arm coupled to a second end of the first arm and coupled to a second end of the second arm, the second end of the first arm and the second end of the second arm being fixed for displacement with the third arm.

7. The intake manifold assembly of claim 6, further comprising an actuation mechanism coupled to the third arm, the third arm displaceable by the actuation mechanism to displace the first and second vanes between the opened and closed positions.

8. The intake manifold assembly of claim 7, wherein the third arm is displaceable in a direction generally perpendicular to a rotational axis of the first pivot member.

9. The intake manifold assembly of claim 6, wherein the first pivot member defines a first rotational axis spaced apart from and generally parallel to a rotational axis defined by the second pivot member.

10. The intake manifold assembly of claim 6, wherein the intake manifold defines a third intake passage providing air flow to a third intake port of the cylinder head, the third intake passage being unobstructed when the first and second vanes are in the closed position.

11. An engine assembly comprising:
a cylinder head defining first and second intake ports;
an intake manifold assembly coupled to the cylinder head and defining a first intake passage in communication with the first intake port and a second intake passage in communication with the second intake port;
a first vane rotatably coupled to the intake manifold assembly and located within an outlet of the first intake passage, the first vane displaceable from an open position where the first vane extends along a first wall defining the first intake passage to a closed position where the first vane extends inwardly from the first wall to obstruct an air flow to the first intake port;
a second vane rotatably coupled to the intake manifold assembly and located within the second intake passage, the second vane displaceable from an open position where the second vane extends along a second wall defining the second intake passage to a closed position where the second vane extends inwardly from the second wall to obstruct an air flow to the second intake port;
an actuation mechanism coupled to the first and second vanes to rotate the first and second vanes between the opened and closed positions;
a first pivot member rotatably coupled to the intake manifold assembly adjacent the first wall, the first vane fixed for rotation with the first pivot member;
a second pivot member rotatably coupled to the intake manifold adjacent the second wall, the second vane fixed for rotation with the second pivot member;
a first arm having a first end fixed for rotation with the first pivot member;
a second arm having a first end fixed for rotation with the second pivot member; and
a third arm coupled to the actuation mechanism and coupled to a second end of the first arm and a second end of the second arm, the second end of the first arm and the second end of the second arm being fixed for displacement with the third arm.

12. The engine assembly of claim 11, wherein the intake manifold assembly includes an intake manifold and a plate coupled to an outlet of the intake manifold and located between the intake manifold and the cylinder head, the plate defining the first and second intake passages.

13. The engine assembly of claim 11, wherein the first pivot member defines a first rotational axis spaced apart from and generally parallel to a rotational axis defined by the second pivot member.

14. The engine assembly of claim 11, wherein the intake manifold assembly defines a third intake passage providing air flow to a third intake port of the cylinder head, the third intake passage being unobstructed when the first and second vanes are in the closed position.

* * * * *